United States Patent

Huang

(10) Patent No.: US 11,956,814 B2
(45) Date of Patent: Apr. 9, 2024

(54) CYCLIC SHIFT MAPPING FOR MULTIPLEXED MESSAGES WITH DIFFERENT PRIORITIES

(71) Applicant: QUALCOMM Incorporated, San Diego, CA (US)

(72) Inventor: Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 17/457,540

(22) Filed: Dec. 3, 2021

(65) Prior Publication Data

US 2022/0322378 A1 Oct. 6, 2022

Related U.S. Application Data

(60) Provisional application No. 63/200,974, filed on Apr. 6, 2021.

(51) Int. Cl.
*H04L 27/26* (2006.01)
*H04W 72/12* (2023.01)
*H04W 72/566* (2023.01)

(52) U.S. Cl.
CPC ....... *H04W 72/566* (2023.01); *H04L 27/2602* (2013.01)

(58) Field of Classification Search
CPC ............. H04L 27/2602; H04L 5/0014; H04W 72/566; H04W 72/569; H04W 72/1268
See application file for complete search history.

(56) References Cited

FOREIGN PATENT DOCUMENTS

WO WO-2018203686 A1 11/2018

OTHER PUBLICATIONS

Huawei et al.: Short PUCCH for UCI of up to 2 bits; 3GPP Draft; R1-1719391, 3GPP TSG RAN WG1 Meeting #91; Reno, USA, Nov. 27-Dec. 1, 2017 (Year: 2017).*
Huawei, et al., "Short PUCCH for UCI of up to 2 Bits", 3GPP TSG RAN WG1 Meeting #91, R1-1719391, 3rd Generation Partnership Project, Mobile Competence Centre, 650, Route Des Lucioles, F-06921 Sophia-Antipolis Cedex, France, vol. RAN WG1, No. Reno, USA, Nov. 27-Dec. 1, 2017 Nov. 18, 2017, XP051369300, 10 Pages.
International Search Report and Written Opinion—PCT/US2022/070825—ISA/EPO—dated Jun. 10, 2022.

(Continued)

*Primary Examiner* — Melvin C Marcelo
*Assistant Examiner* — Natali Pascual Peguero
(74) *Attorney, Agent, or Firm* — Harrity & Harrity, LLP

(57) ABSTRACT

Various aspects of the present disclosure generally relate to wireless communication. In some aspects, a user equipment (UE) may generate a multiplexed message including first information with a first priority and second information with a second priority, wherein the first priority is higher than the second priority. The UE may transmit the multiplexed message using a particular cyclic shift of a particular cyclic shift set of a plurality of cyclic shift sets, wherein the particular cyclic shift set is based at least in part on the first information and the particular cyclic shift is based at least in part on the second information. Numerous other aspects are described.

30 Claims, 14 Drawing Sheets

(56) References Cited

OTHER PUBLICATIONS

Mediatek Inc: "Discussion on Short-PUCCH for UCI of up to 2 Bits", 3GPP TSG RAN WG1 Meeting 91, R1-1719570, 3rd Generation Partnership Project, Mobile Competence Centre, 650, Route Des Lucioles, F-06921 Sophia-Antipolis Cedex, vol. RAN WG1, No. Reno, USA, Nov. 27-Dec. 1, 2017, Nov. 18, 2017, XP051369384, 2 Pages.
Qualcomm Incorporated: "Intra-UE Multiplexing and Prioritization for IOT and URLLC", 3GPP TSG RAN WG1 #106-e, R1-2107339, 3rd Generation Partnership Project, Mobile Competence Centre, 650, Route Des Lucioles, F-06921 Sophia-Antipolis Cedex, France, vol. RAN WG1, No. e-Meeting, Aug. 16-Aug. 27, 2021 Aug. 7, 2021, XP052038291, pp. 1-22.
VIVO: "Remaining Issues on PUCCH with Short-Duration", 3GPP TSG RAN WG1 Meeting #92bis, R1-1803832, 3rd Generation Partnership Project, Mobile Competence Centre, 650, Route Des Lucioles, F-06921 Sophia-Antipolis Cedex, F, vol. RAN WG1, No. Sanya, China, Apr. 16-Apr. 20, 2018 Apr. 6, 2018, XP051413014, pp. 1-8.

* cited by examiner

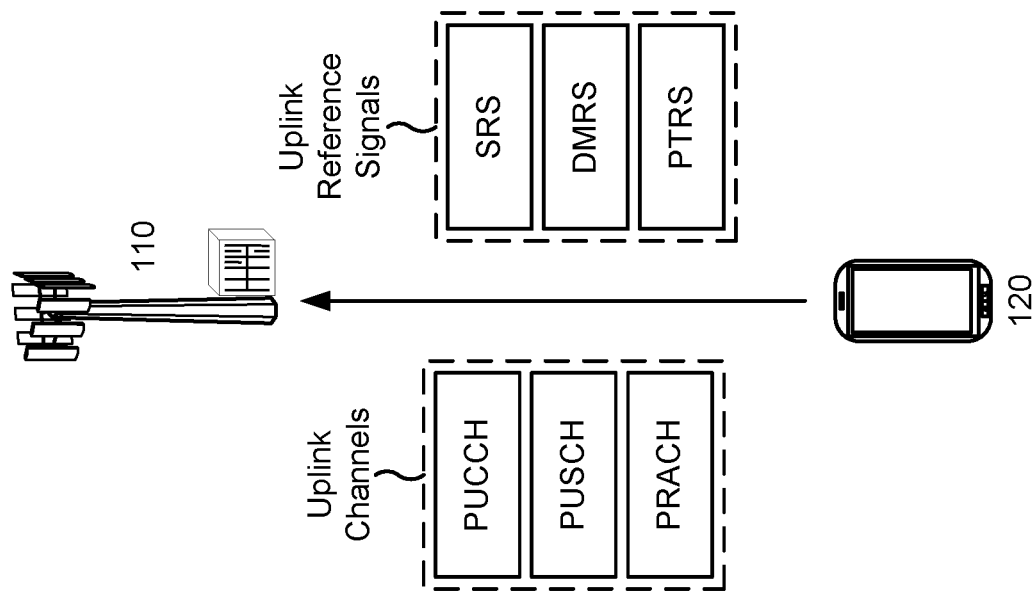
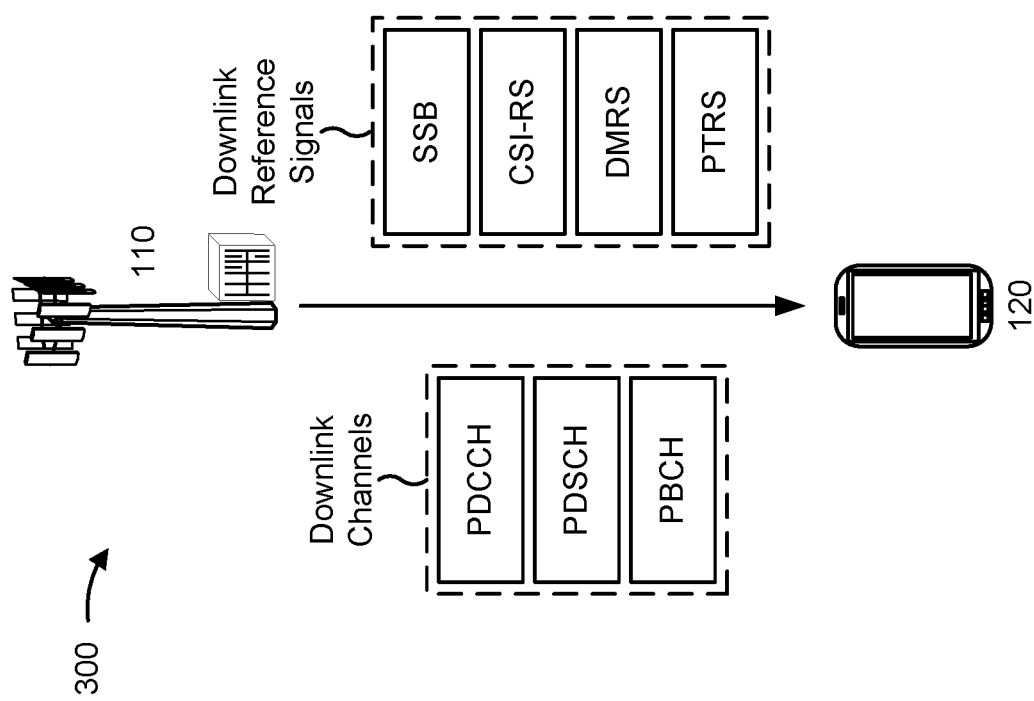
FIG. 3

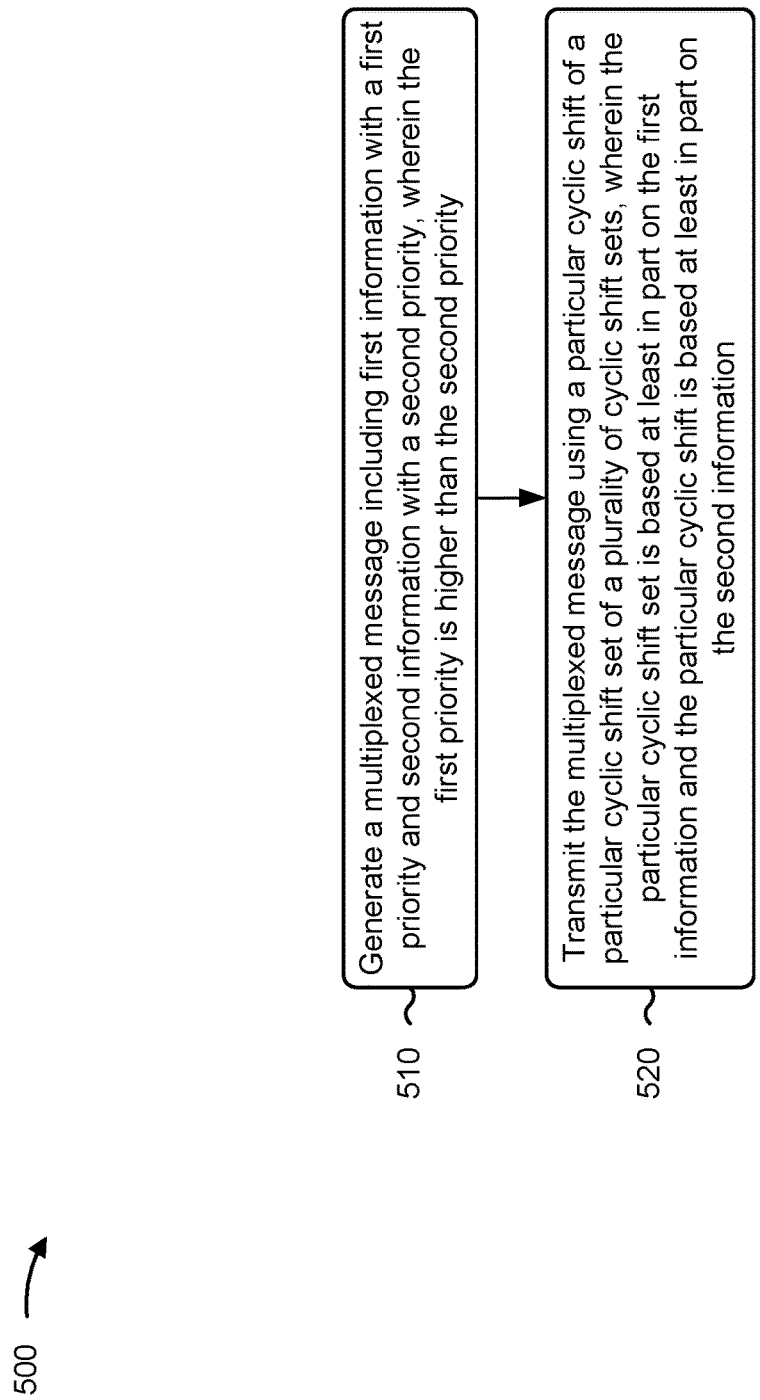

CYCLIC SHIFT MAPPING FOR MULTIPLEXED MESSAGES WITH DIFFERENT PRIORITIES

CROSS-REFERENCE TO RELATED APPLICATION

This Patent Application claims priority to U.S. Provisional Patent Application No. 63/200,974, filed on Apr. 6, 2021, entitled "CYCLIC SHIFT MAPPING FOR MULTIPLEXED MESSAGES WITH DIFFERENT PRIORITIES," and assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses for cyclic shift mapping for multiplexed messages with different priorities.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes generating a multiplexed message including first information with a first priority and second information with a second priority, wherein the first priority is higher than the second priority; and transmitting the multiplexed message using a particular cyclic shift of a particular cyclic shift set of a plurality of cyclic shift sets, wherein the particular cyclic shift set is based at least in part on the first information and the particular cyclic shift is based at least in part on the second information.

In some aspects, a method of wireless communication performed by a base station includes receiving a multiplexed message using a particular cyclic shift of a particular cyclic shift set of a plurality of cyclic shift sets, wherein the particular cyclic shift set is based at least in part on first information of the multiplexed message and the particular cyclic shift is based at least in part on second information of the multiplexed message, wherein the first information is associated with a first priority and the second information is associated with a second priority that is lower than the first priority; and decoding the multiplexed message to determine a first content of the first information based at least in part on the particular cyclic shift set and a second content of the second information based at least in part on the particular cyclic shift.

In some aspects, a UE for wireless communication includes a memory; and one or more processors, coupled to the memory, configured to: generate a multiplexed message including first information with a first priority and second information with a second priority, wherein the first priority is higher than the second priority; and transmit the multiplexed message using a particular cyclic shift of a particular cyclic shift set of a plurality of cyclic shift sets, wherein the particular cyclic shift set is based at least in part on the first information and the particular cyclic shift is based at least in part on the second information.

In some aspects, a base station for wireless communication includes a memory; and one or more processors, coupled to the memory, configured to: receive a multiplexed message using a particular cyclic shift of a particular cyclic shift set of a plurality of cyclic shift sets, wherein the particular cyclic shift set is based at least in part on first information of the multiplexed message and the particular cyclic shift is based at least in part on second information of the multiplexed message, wherein the first information is associated with a first priority and the second information is associated with a second priority that is lower than the first priority; and decode the multiplexed message to determine a first content of the first information based at least in part on the particular cyclic shift set and a second content of the second information based at least in part on the particular cyclic shift.

In some aspects, a non-transitory computer-readable medium storing a set of instructions for wireless communication includes one or more instructions that, when executed by one or more processors of a UE, cause the UE to: generate a multiplexed message including first information with a first priority and second information with a second priority, wherein the first priority is higher than the second priority; and transmit the multiplexed message using a particular cyclic shift of a particular cyclic shift set of a plurality of cyclic shift sets, wherein the particular cyclic shift set is based at least in part on the first information and the particular cyclic shift is based at least in part on the second information.

In some aspects, a non-transitory computer-readable medium storing a set of instructions for wireless communication includes one or more instructions that, when executed by one or more processors of a base station, cause the base station to: receive a multiplexed message using a particular cyclic shift of a particular cyclic shift set of a plurality of cyclic shift sets, wherein the particular cyclic shift set is based at least in part on first information of the multiplexed message and the particular cyclic shift is based at least in part on second information of the multiplexed message, wherein the first information is associated with a first priority and the second information is associated with a second priority that is lower than the first priority; and decode the multiplexed message to determine a first content of the first information based at least in part on the particular cyclic shift set and a second content of the second information based at least in part on the particular cyclic shift.

In some aspects, an apparatus for wireless communication includes means for generating a multiplexed message including first information with a first priority and second information with a second priority, wherein the first priority is higher than the second priority; and means for transmitting the multiplexed message using a particular cyclic shift of a particular cyclic shift set of a plurality of cyclic shift sets, wherein the particular cyclic shift set is based at least in part on the first information and the particular cyclic shift is based at least in part on the second information.

In some aspects, an apparatus for wireless communication includes means for receiving a multiplexed message using a particular cyclic shift of a particular cyclic shift set of a plurality of cyclic shift sets, wherein the particular cyclic shift set is based at least in part on first information of the multiplexed message and the particular cyclic shift is based at least in part on second information of the multiplexed message, wherein the first information is associated with a first priority and the second information is associated with a second priority that is lower than the first priority; and means for decoding the multiplexed message to determine a first content of the first information based at least in part on the particular cyclic shift set and a second content of the second information based at least in part on the particular cyclic shift.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of physical channels and reference signals in a wireless network, in accordance with the present disclosure.

FIGS. 5-6 are diagrams illustrating example processes associated with cyclic shift mapping for multiplexed messages with different priorities, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
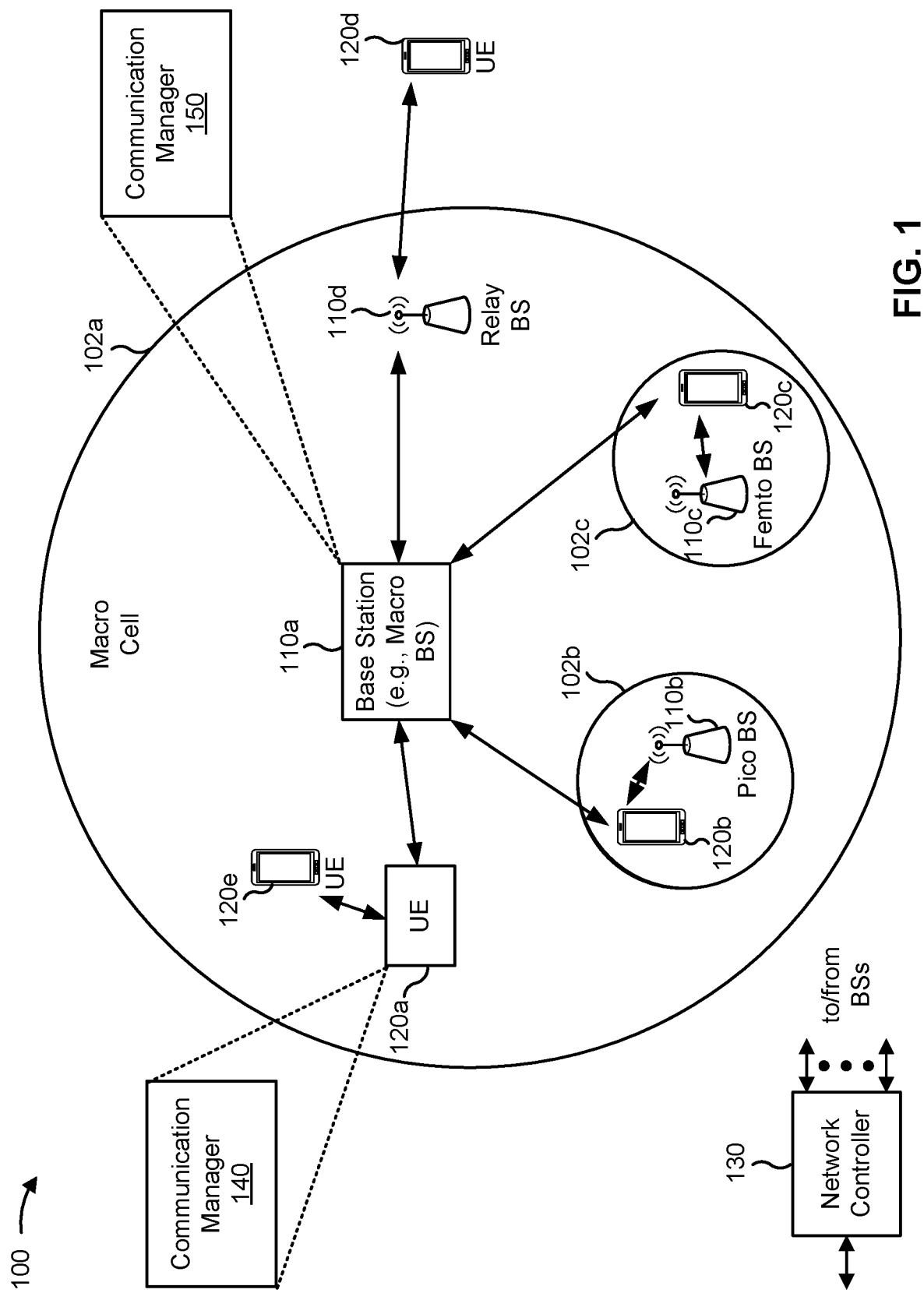
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may generate a multiplexed message including first information with a first priority and second information with a second priority, wherein the first priority is higher than the second priority; and transmit the multiplexed message using a particular cyclic shift of a particular cyclic shift set of a plurality of cyclic shift sets, wherein the particular cyclic shift set is based at least in part on the first information and the particular cyclic shift is based at least in part on the second information. Additionally, or alternatively, the communication manager 140 may perform one or more other operations described herein.

In some aspects, the base station 110 may include a communication manager 150. As described in more detail elsewhere herein, the communication manager 150 may receive a multiplexed message using a particular cyclic shift of a particular cyclic shift set of a plurality of cyclic shift sets, wherein the particular cyclic shift set is based at least in part on first information of the multiplexed message and the particular cyclic shift is based at least in part on second information of the multiplexed message, wherein the first information is associated with a first priority and the second information is associated with a second priority that is lower than the first priority; and decode the multiplexed message to determine a first content of the first information based at least in part on the particular cyclic shift set and a second content of the second information based at least in part on the particular cyclic shift. Additionally, or alternatively, the communication manager 150 may perform one or more other operations described herein.

As indicated above, FIG. 1 is provided as an example. Other examples may differ from what is described with regard to FIG. 1.

Figure 2:
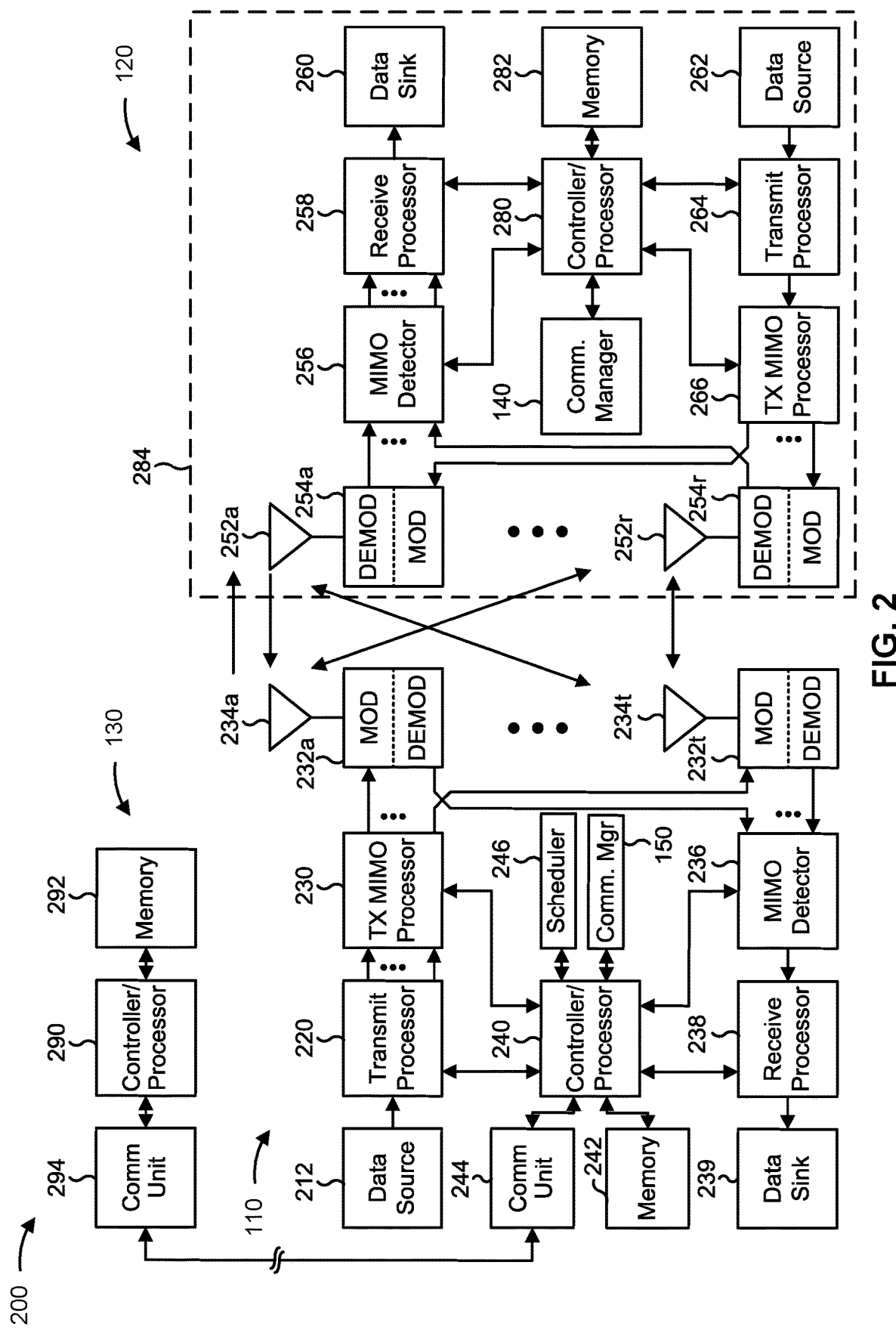
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4A-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4A-8).

The controller/processor 240 of the base station 110, the controller/processor 280 of the UE 120, and/or any other component(s) of FIG. 2 may perform one or more techniques associated with cyclic shift mapping for multiplexed messages that include different priority information, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE 120 includes means for generating a multiplexed message including first information with a first priority and second information with a second priority, wherein the first priority is higher than the second priority; and/or means for transmitting the multiplexed message using a particular cyclic shift of a particular cyclic shift set of a plurality of cyclic shift sets, wherein the particular cyclic shift set is based at least in part on the first information and the particular cyclic shift is based at least in part on the second information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for receiving a multiplexed message using a particular cyclic shift of a particular cyclic shift set of a plurality of cyclic shift sets, wherein the particular cyclic shift set is based at least in part on first information of the multiplexed message and the particular cyclic shift is based at least in part on second information of the multiplexed message, wherein the first information is associated with a first priority and the second information is associated with a second priority that is lower than the first priority; and/or means for decoding the multiplexed message to determine a first content of the first information based at least in part on the particular cyclic shift set and a second content of the second information based at least in part on the particular cyclic shift. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. The UE 120 may transmit acknowledgement (ACK) or negative acknowledgement (NACK) feedback (e.g., ACK/NACK feedback or ACK/NACK information) in UCI on the PUCCH and/or the PUSCH.

The PUCCH may convey different types of payload data, such as a scheduling request (SR) or a hybrid automatic repeat request (HARQ) feedback message, among other examples. For example, the PUCCH may include a 1 bit SR in PUCCH format 0 that overlaps (e.g., in terms of time resources) with a 1 or 2 bit HARQ ACK message in PUCCH format 0. Different messages included in the PUCCH may be associated with different priorities. For example, the 1 bit SR may have a relatively high priority and the 1 or 2 bit HARQ-ACK may have a relatively low priority. Similarly, the 1 or 2 bit HARQ ack may have a relatively high priority and the 1 bit SR may have a relatively low priority. Other types of payload may be possible with other types or levels of priority. Additionally, combinations of payloads may be possible. For example, the PUCCH may convey a first payload at a first frequency that includes first bits of a message with a first priority and may convey a second payload at a second frequency that includes second bits of the message with a second priority.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. The base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. The base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

A UE may transmit a PUCCH with a particular base sequence at a particular resource block (RB) with a particular amount of cyclic shift (CS). For example, a UE may transmit a 1 bit SR on PUCCH format 0 using a base sequence Sin 1 RB and with a particular CS in the time domain. In this case, the particular CS may be a CS value between 0 and 11 (e.g., 12 discrete CS values may be permitted). Out of the set of possible CSs, the BS may transmit a radio resource control (RRC) message to a UE to indicate which CS index i the UE is to convey each possible value for a message that the UE is to convey on the PUCCH. For example, the BS may configure the UE to use a CS value of 2 to transmit a positive SR and to transmit nothing to convey a negative SR.

When there are a plurality of possible values that the UE is to convey via use of a CS value, the BS may select CS values that are equidistant with respect to the set of possible CS values. For example, the BS may configure the UE to transmit a one bit HARQ feedback message by using a CS value of 0 (e.g., of the possible CS values 0 to 11) to indicate a first value for the HARQ feedback message (e.g., an ACK/NACK value (A/N value) a value of "{0}") and a CS value of 6 to indicate a second value for the HARQ feedback message (e.g., an A/N value of "{1}"). For 2 bit HARQ feedback, the BS may configure the UE to use the CS value of 0 (e.g., of the possible CS values 0 to 11) for a first A/N value "{0, 0}", the CS value of 3 for a second A/N value "{0, 1}", the CS value of 6 for a third A/N value "{1, 0}", and the CS value of 9 for a fourth A/N value "{1, 0}". Other types of payload, values for the payload, or configurations of CS values may be possible. By selecting CS values that are equidistant with respect to the set of possible CS values, the BS maximizes a gap or spacing between different selected CS values, which increases a likelihood that the BS can successfully decode the PUCCH from the UE.

When the UE is to convey a plurality of payloads with the same priority, the BS may configure the UE with a plurality of sets of CS values to convey the plurality of payloads. For example, when the UE is to convey both an SR and a HARQ feedback message, the UE may be configured to use a first set of CS values (e.g., 0 and 6) to indicate a negative SR and may select a first CS value from the first set of CS values (e.g., 0) to indicate an A/N value of "{0}" and a second CS value from the first set of CS values (e.g., 6) to indicate an A/N value of "{1}". In contrast, the UE may use a second set of CS values (e.g., 3 and 9) to indicate a positive SR and may select a first CS value from the first set of CS values (e.g., 3) to indicate an A/N value of "{0}" and a second CS value from the first set of CS values (e.g., 9) to indicate an A/N value of "{1}". In another example, for 2 bit HARQ feedback, the UE may have a first set of CS values (e.g., 0, 3, 6, 9) to indicate negative SR and select one of the first set of CS values to indicate which A/N value is also being indicated and may have a second set of CS values (e.g., 1, 4, 7, 10) to indicate a positive SR and select one of the second set of CS values to indicate which A/N value is also being indicated. In this case, CS values within each set of CS values are equidistant (e.g., 0, 3, 6, and 9 are equidistant with respect to CS values 0 to 11, as are 1, 4, 7, and 10), but, as a result, a spacing between each whole set of CS values is relatively small (e.g., 0 and 1 are adjacent, 3 and 4 are adjacent, etc.). Here, the relatively small spacing between sets of CS values may be termed "adjacent sets" or "near adjacent sets". Similarly, the relatively large spacing between CS values within a particular set of CS values may be termed "equidistant" spacing, as described above, or "inverse" spacing.

When the UE has a plurality of payloads with different priorities, the UE may be configured to drop a lower priority payload and only transmit the higher priority payload. For example, when the UE is to transmit a high priority 1 bit SR and a low priority 1 or 2 bit HARQ feedback message, the UE may drop the low priority 1 or 2 bit HARQ feedback message and transmit the 1 bit SR. In this case, the UE may use CS values configured for conveying only the 1 bit SR (e.g., CS value 2 for positive SR, no transmission for negative SR, as described above). Similarly, when the UE is to transmit a high priority 1 or 2 bit HARQ feedback message and a low priority 1 bit SR, the UE may drop the 1 bit SR and transmit the 1 or 2 bit HARQ feedback message (e.g., CS values 0 or 6 for a 1 bit A/N value or CS values 0, 3, 6, or 9 for a 2 bit A/N value, as described above).

However, dropping a lower priority payload may result in information not being conveyed to the BS. Alternatively, the UE may use additional network resources for another transmission to convey the dropped lower priority payload at another time, which may result in an inefficient network utilization. Some aspects described herein enable transmission of a plurality of payloads in a multiplexed message of a PUCCH using different cyclic shifts. Rather than selecting from adjacent sets or near adjacent sets with equidistant spacing, the UE may be configured to select form inverse sets with adjacent spacing. In other words, the BS may configure a UE to select a set of CS values to convey a high priority payload and select from among the selected set of CS values to convey a low priority payload. As a particular example, with a high priority 1 bit SR and a low priority 1 bit HARQ feedback message, the UE may be configured to select a first set of CS values (0, 1 among CS values 0 to 11) to convey a negative SR and a second set of CS values (6, 7 among CS values 0 to 11) to convey a positive SR.

In this case, by using sets of CS values that have a maximum separation from each other (e.g., (0, 1) is as far as possible from (6, 7) with respect to CS values 0 to 11 where there is wrap-around and 11 is adjacent to 0), the UE increases a likelihood that the BS can successfully decode high priority SR bit relative to having values for the SR bit closer together as described above for the case of two payloads with equal priority. Further to the particular example, the UE may be configured to select a particular CS value to convey the low priority bit, such as selecting CS value 0 for A/N value {0} and CS value 1 for A/N value {1} within the CS value set 0, 1 for a negative SR. In this way, although a separation between CS values is minimized (to maximize a separation between sets of CS values), which may increase a likelihood that a BS unsuccessfully decodes the HARQ feedback (e.g., the BS is unable to differentiate CS value 0 from CS value 1 successfully) the UE avoids dropping the low priority payload, thereby reducing a likelihood of dropped information or use of excess network resources as described above for the case of two payloads with different priority.

FIGS. 4A-4G are diagrams illustrating an example 400 associated with cyclic shift mapping for multiplexed messages with different priorities, in accordance with the present disclosure. As shown in FIG. 4, example 400 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

Figure 4A:
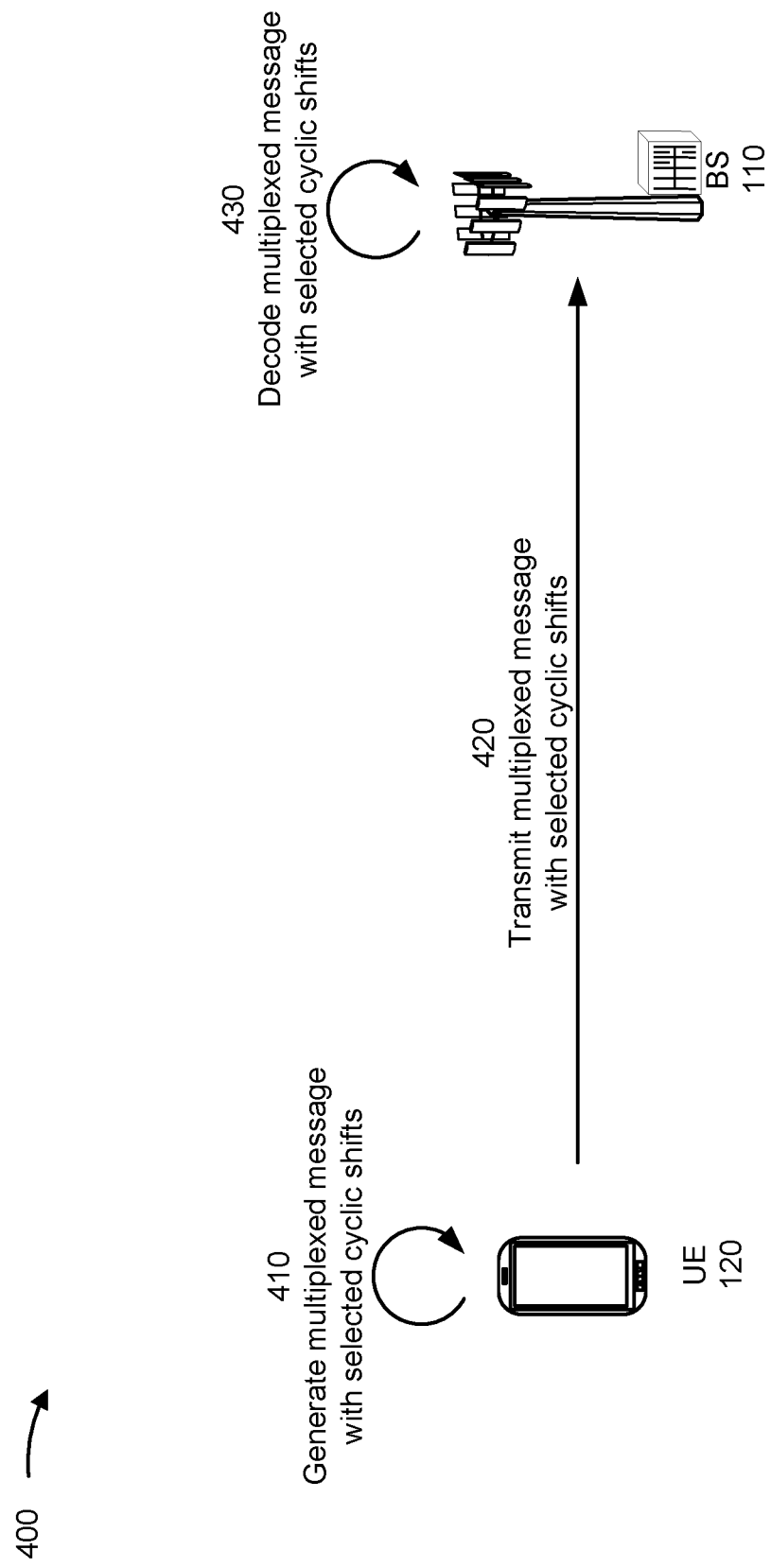
FIGS. 4A-4G are diagrams illustrating examples associated with cyclic shift mapping for multiplexed messages with different priorities, in accordance with the present disclosure.

As further shown in FIG. 4A, and by reference number 410, UE 120 may generate a multiplexed message with a selected cyclic shift. For example, UE 120 may select a cyclic shift set, from a plurality of possible cyclic shift sets, and may select a cyclic shift within the cyclic shift set, and may generate the multiplexed message to use the selected cyclic shift. In this case, the selection of the cyclic shift set may be based at least in part on a value of a first, high priority payload of the multiplexed message and the selection of the cyclic shift within the cyclic shift set may be based at least in part on a value of a second, low priority payload of the multiplexed message. For example, when the multiplexed message conveys an SR as a high priority payload and a HARQ feedback message as a low priority payload, UE 120 may select a cyclic shift set to indicate a value for the SR (e.g., positive or negative) and a cyclic shift within the selected cyclic shift set to indicate an A/N value (e.g., {0} or {1} for 1 bit HARQ feedback or {0, 0}, {0, 1}, {1, 1}, or {1, 0} for 2 bit HARQ feedback).

In some aspects, UE 120 may select a cyclic shift set and/or a cyclic shift based at least in part on configuration information. For example, UE 120 may receive RRC signaling from base station 110 identifying possible cyclic shift sets for possible values of a high priority payload and possible cyclic shifts for possible values of a low priority payload. Additionally, or alternatively, UE 120 may receive other signaling identifying the possible cyclic shift sets or cyclic shifts. Additionally, or alternatively, UE 120 may use a stored configuration defining the possible cyclic shift sets or cyclic shifts. In some aspects, UE 120 may be configured with a plurality of configurations for a plurality of different possible payloads. For example, UE 120 may include a first configuration of cyclic shift sets and cyclic shifts for a first possible set of payloads and a second configuration of cyclic shift sets and cyclic shifts for a second possible set of payloads. In this case, UE 120 and/or base station 110 may communicate to synchronize which set of payloads is to be included in the multiplexed message and, accordingly, which configuration is to be used. Additionally, or alternatively, UE 120 and/or base station 110 may operate in accordance with a stored configuration that defines which set of payloads is to be included in the multiplexed message (e.g., based at least in part on a timing, an order, an operation mode, etc.) and, accordingly, which configuration is to be used.

Figure 4B:
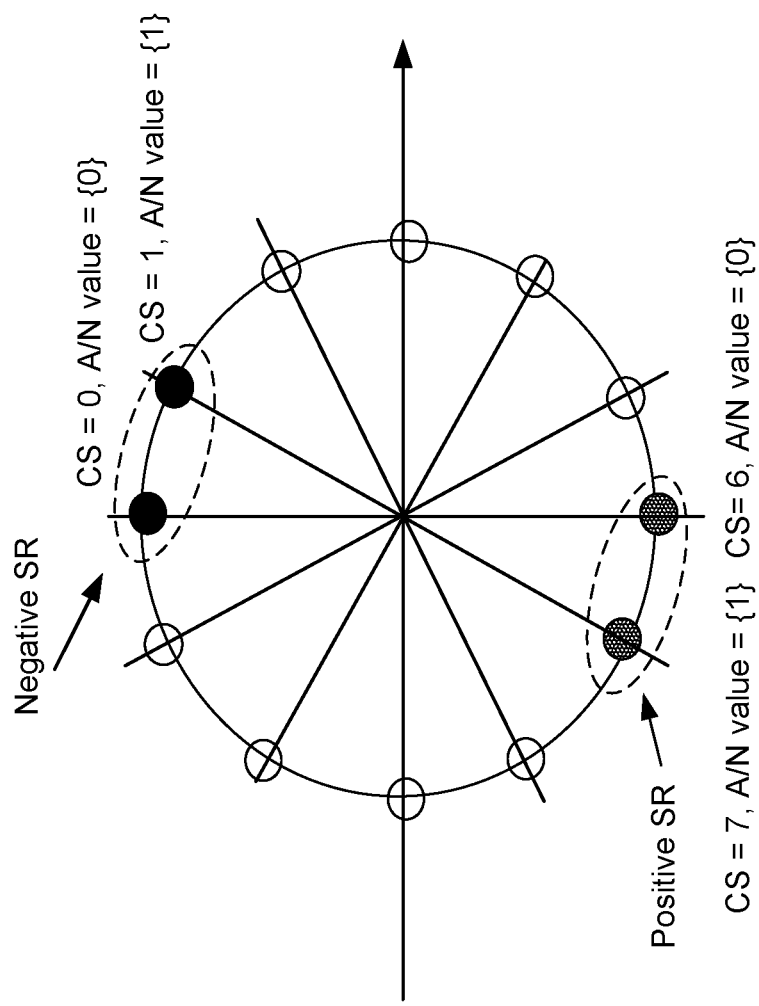

As a first example 411, and as shown by FIG. 4B, UE 120 may be configured to transmit a multiplexed message conveying a high priority SR and a low priority 1 bit HARQ feedback message. In this case, UE 120 may select a first cyclic shift set (e.g., CS values 0 or 1) to convey a negative SR and a second cyclic shift set (e.g., CS values 6 or 7) to convey a positive SR. A spacing between the first cyclic shift set and the second cyclic shift set (in this example, 5 cyclic shifts) may be defined as a first value d1. In some aspects, the spacing, d1, may be maximized within an available space (e.g., to be, in this example, 5 cyclic shifts). In some aspects, the spacing, d1, may be configured to be greater than a spacing, d2, between cyclic shifts within a cyclic shift set (in this example, 1 cyclic shift). In this way, by having d1>d2, UE 120 increases a likelihood that base station 110 successfully decodes the high priority SR (e.g., by making differentiating whether the used CS value either is a 0 or 1 or is a 6 or 7 easier). Similarly, UE 120 may select a cyclic shift from within a cyclic shift set to convey a value for the low priority 1 bit HARQ feedback message (from cyclic shifts with a spacing, d2). For example, when UE 120 is conveying a negative SR (cyclic shift set 0 or 1), UE 120 may select CS value 0 for A/N value {0} and CS value 1 for A/N value {1}. Similarly, when UE 120 is conveying a positive SR (cyclic shift set 6 or 7), UE 120 may select CS value 6 for A/N value {0} and CS value 7 for A/N value {1}. Although differentiating the low priority payload may be more difficult at base station 110 then if the low priority payload had a greater separation (e.g., as may occur if d2>d1), UE 120 ensures prioritization of the high priority payload (e.g., by having d1>d2) and still conveys the low priority payload (rather than dropping the low priority payload). In this way, UE 120 conveys the low priority payload without negatively impacting a likelihood of successful decoding of the high priority payload, thereby improving network performance.

Figure 4C:
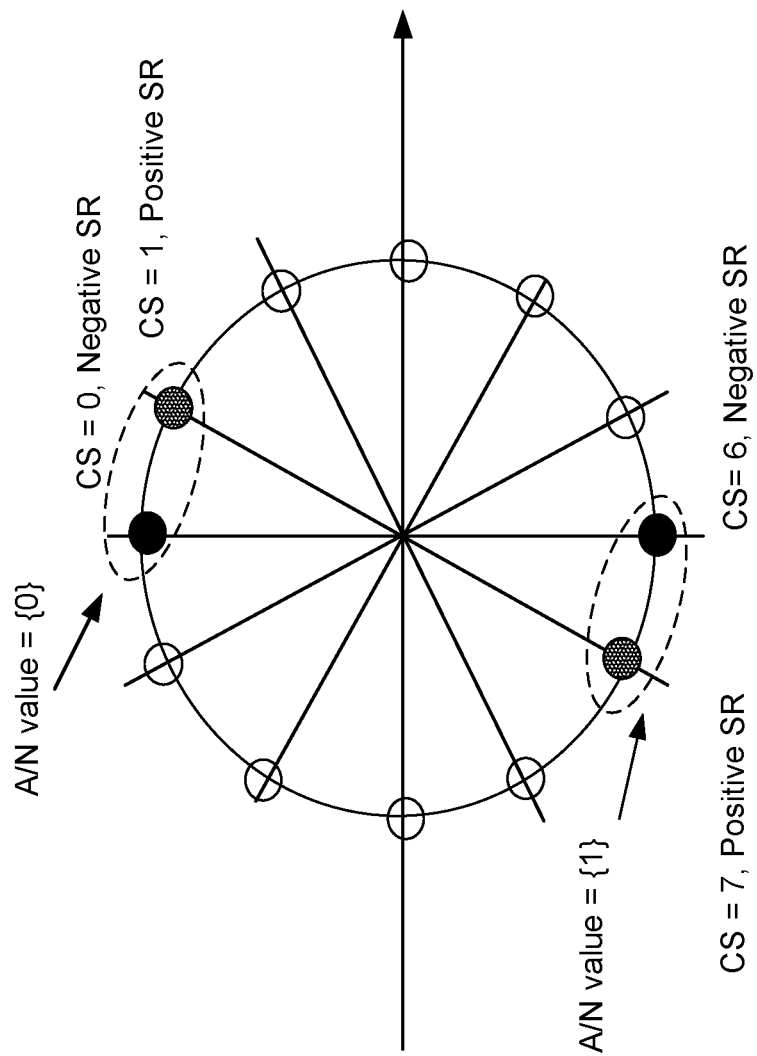

As a second example 412, and as shown by FIG. 4C, UE 120 may be configured to transmit a multiplexed message conveying a low priority SR and a high priority 1 bit HARQ feedback message. In this case, UE 120 may select a first cyclic shift set (e.g., CS values 0 or 1) to convey A/N value {0} and a second cyclic shift set (e.g., CS values 6 or 7) to convey A/N value {1}. In this way, by maximizing a spacing between cyclic shift sets, UE 120 increases a likelihood that base station 110 successfully decodes the high priority HARQ feedback message. Similarly, UE 120 may select a cyclic shift from within a cyclic shift set to convey a value for the low priority SR message. For example, when UE 120 is conveying A/N value {0} (cyclic shift set 0 or 1), UE 120 may select CS value 0 for a negative SR and CS value 1 for a positive SR. Similarly, when UE 120 is conveying A/N value {1} (cyclic shift set 6 or 7), UE 120 may select CS value 6 for a negative SR and CS value 7 for a positive SR.

Although some implementations are described herein in terms of a particular quantity of CS values, arrangement of cyclic shift sets, types of multiplexed messages, etc. other configurations may be possible. For example, rather than cyclic shift sets of 0 or 1 and 6 or 7, UE 120 may select from a cyclic shift set of 1 or 2 and 7 or 8. Similarly, rather than selecting from CS values 0 to 11, in another configuration, UE 120 may select from CS values 0 to 23 (e.g., and select cyclic shift sets 0 or 1 and 12 or 13). Similarly, rather than selecting from two possible cyclic shift sets, UE 120 may select from other quantities of cyclic shift sets, as described in more detail herein.

Figure 4D:
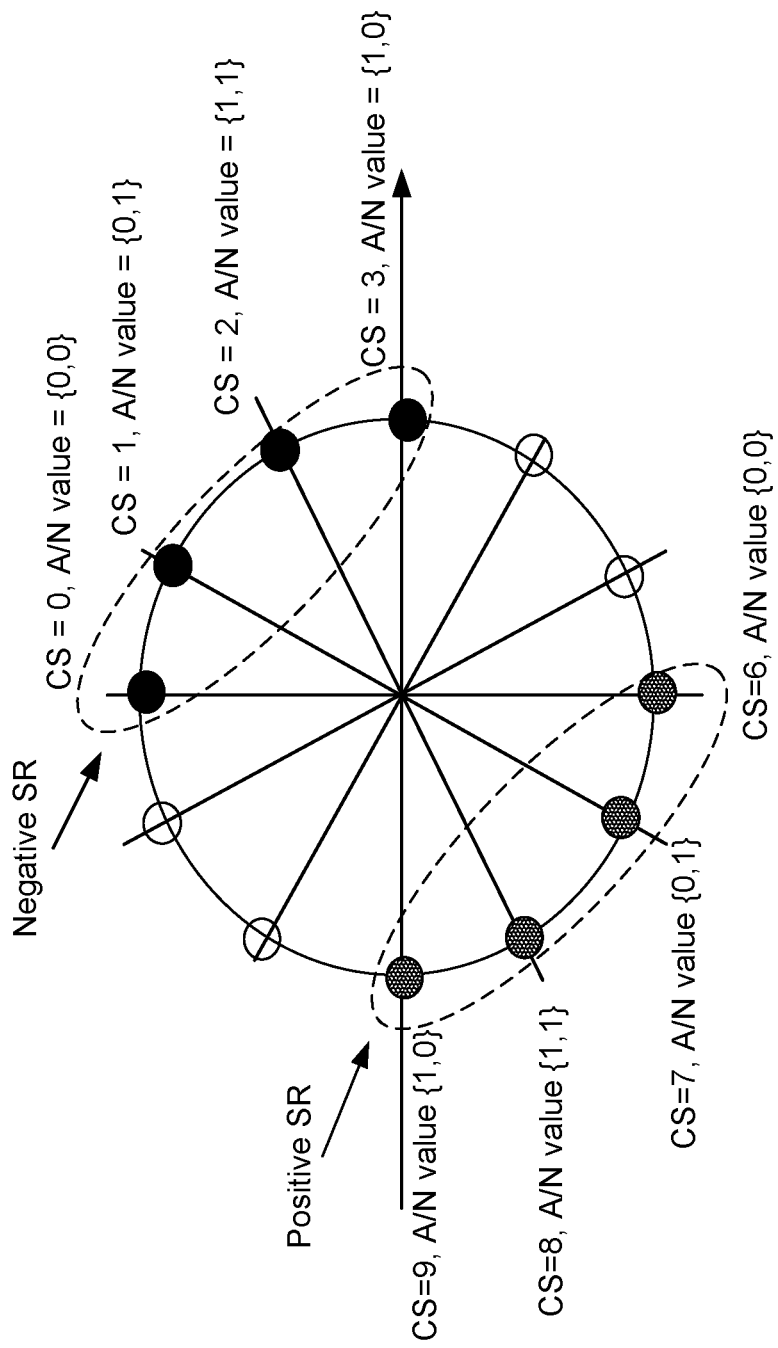

As a third example 413, and as shown by FIG. 4D, UE 120 may be configured to transmit a multiplexed message conveying a high priority SR and a low priority 2 bit HARQ feedback message. In this case, UE 120 may select a first cyclic shift set (e.g., CS values 0, 1, 2, or 3) to convey a negative SR and a second cyclic shift set (e.g., CS values 6, 7, 8, or 9) to convey a positive SR. Similarly, UE 120 may select a cyclic shift from within a cyclic shift set to convey a value for the low priority 2 bit HARQ feedback message. For example, when UE 120 is conveying a negative SR (cyclic shift set 0, 1, 2, or 3), UE 120 may select CS value 0 for A/N value {0, 0}, CS value 1 for A/N value {0, 1}, CS value 2 for A/N value {1, 1}, and CS value 3 for A/N value {1, 0}. Similarly, when UE 120 is conveying a positive SR (cyclic shift set 6, 7, 8, or 9), UE 120 may select CS value 6 for A/N value {0, 0}, CS value 7 for A/N value {0, 1}, CS value 8 for A/N value {1, 1}, and CS value 9 for A/N value {1, 0}. Although differentiating the low priority payload may be more difficult at base station 110 then if the low priority payload had a greater separation, UE 120 still conveys the low priority payload (rather than dropping the low priority payload) without negatively impacting a likelihood of successful decoding of the high priority payload (which has a maximized separation within the available space (e.g., of 12 cyclic shifts) for the quantity of bits that are to be conveyed using the 12 possible CS values), thereby improving network performance.

Figure 4E:
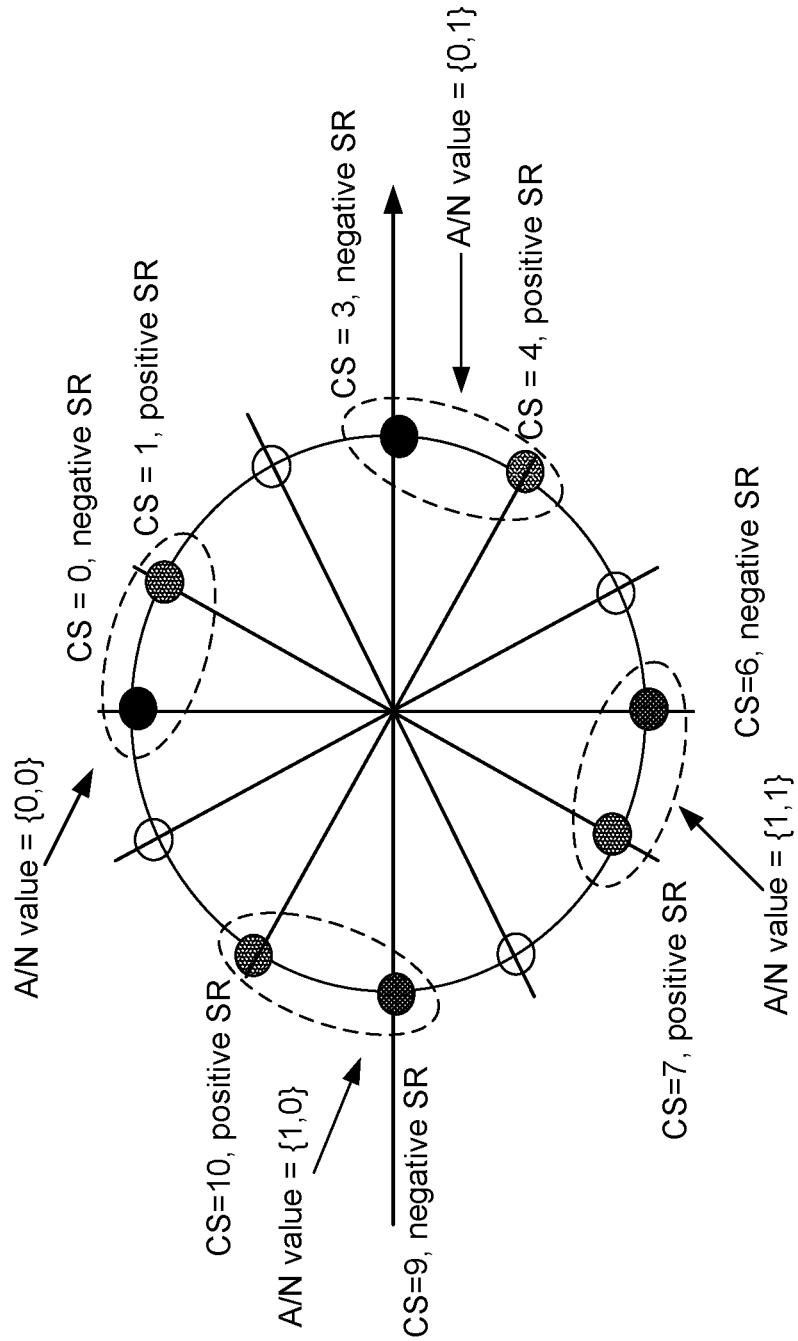

As a fourth example 414, and as shown by FIG. 4E, UE 120 may be configured to transmit a multiplexed message conveying a low priority SR and a high priority 2 bit HARQ feedback message. In this case, UE 120 may select a first cyclic shift set (e.g., CS values 0 or 1) to convey A/N value {0, 0}, a second cyclic shift set (e.g., CS values 3 or 4) to convey A/N value {0, 1}, a third cyclic shift set (e.g., CS values 6 or 7) to convey A/N value {1, 1}, or a fourth cyclic shift set (e.g., CS values 9 or 10) to convey A/N value {1, 0}. Similarly, UE 120 may select a cyclic shift from within a cyclic shift set to convey a value for the low priority SR message. For example, when UE 120 is conveying A/N value {0, 0} (cyclic shift set 0 or 1), UE 120 may select CS value 0 for a negative SR and CS value 1 for a positive SR.

Figure 4F:
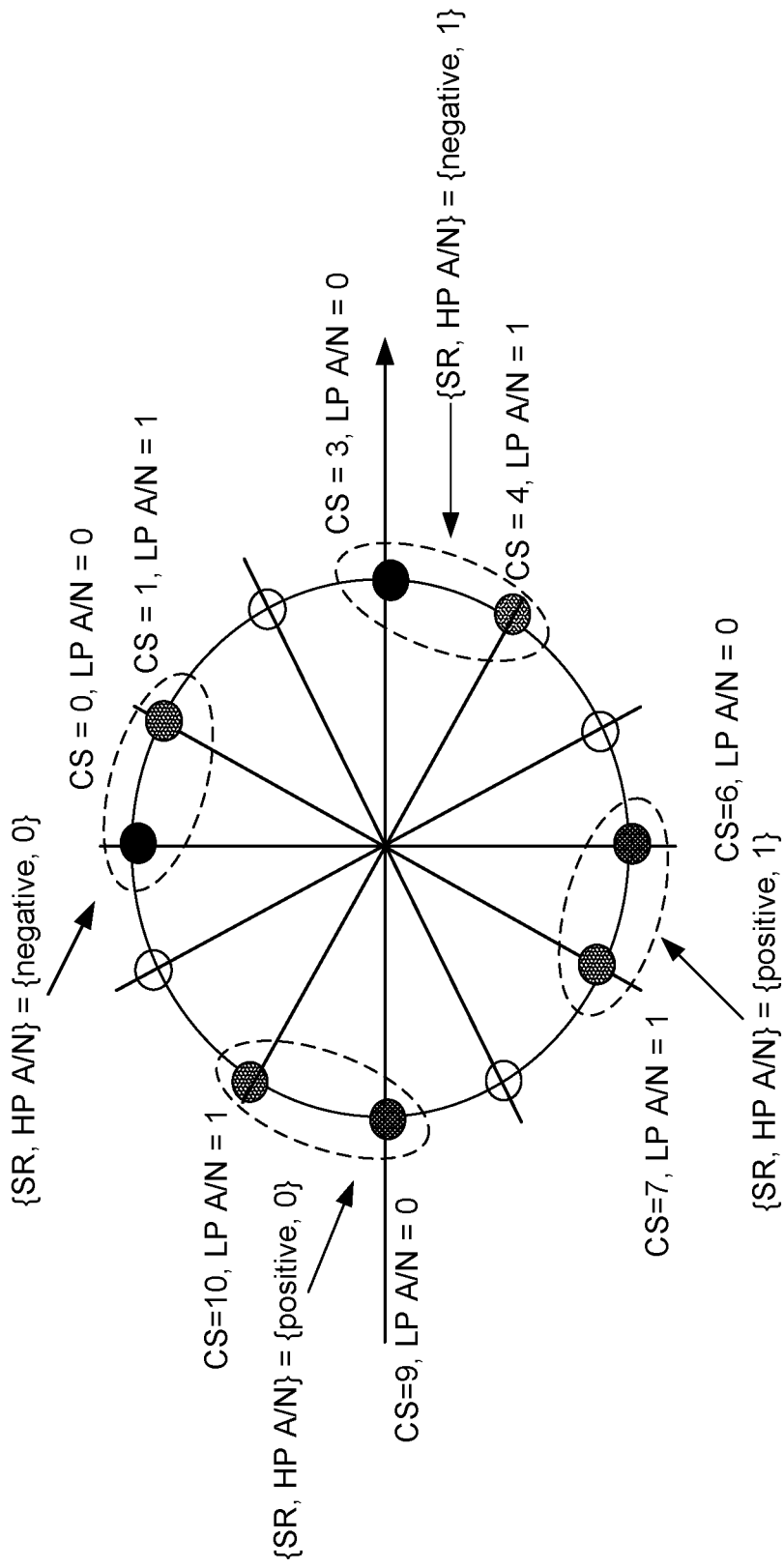

As a fifth example 415, and as shown by FIG. 4F, UE 120 may be configured to transmit a multiplexed message conveying a high priority SR and a 2 bit HARQ feedback message that includes a first bit that is high priority and a second bit that is low priority. In other words, the first, high priority payload may be 1 bit of SR and 1 bit of HARQ feedback and the second, low priority payload may be 1 bit of HARQ feedback. In this case, UE 120 may select a first cyclic shift set (e.g., CS values 0 or 1) to convey a negative scheduling request and an A/N value {0} (collectively, "{negative, 0}"), a second cyclic shift set (e.g., CS values 3 or 4) to convey {negative, 1}, a third cyclic shift set (e.g., CS values 6 or 7) to convey {positive, 1}, or a fourth cyclic shift set (e.g., CS values 9 or 10) to convey {positive, 0}. Similarly, UE 120 may select a cyclic shift from within a cyclic shift set to convey a value for the low HARQ feedback bit. For example, when UE 120 is conveying {negative, 0} (cyclic shift set 0 or 1), UE 120 may select CS value 0 for A/N value {0} (e.g., resulting in a total A/N value of {0, 0}) and CS value 1 for A/N value {1} (e.g., resulting in a total A/N value of {0, 1}). In another example, rather than a high priority SR bit, a high priority A/N value, and a low priority A/N value, UE 120 may use a similar set of cyclic shifts to convey, for example, a first high priority bit (e.g., an SR bit), a second high priority bit (e.g., an A/N value), and a third low priority bit (e.g., a bit that is a third type of PUCCH bit—neither an SR bit nor an A/N value).

Figure 4G:
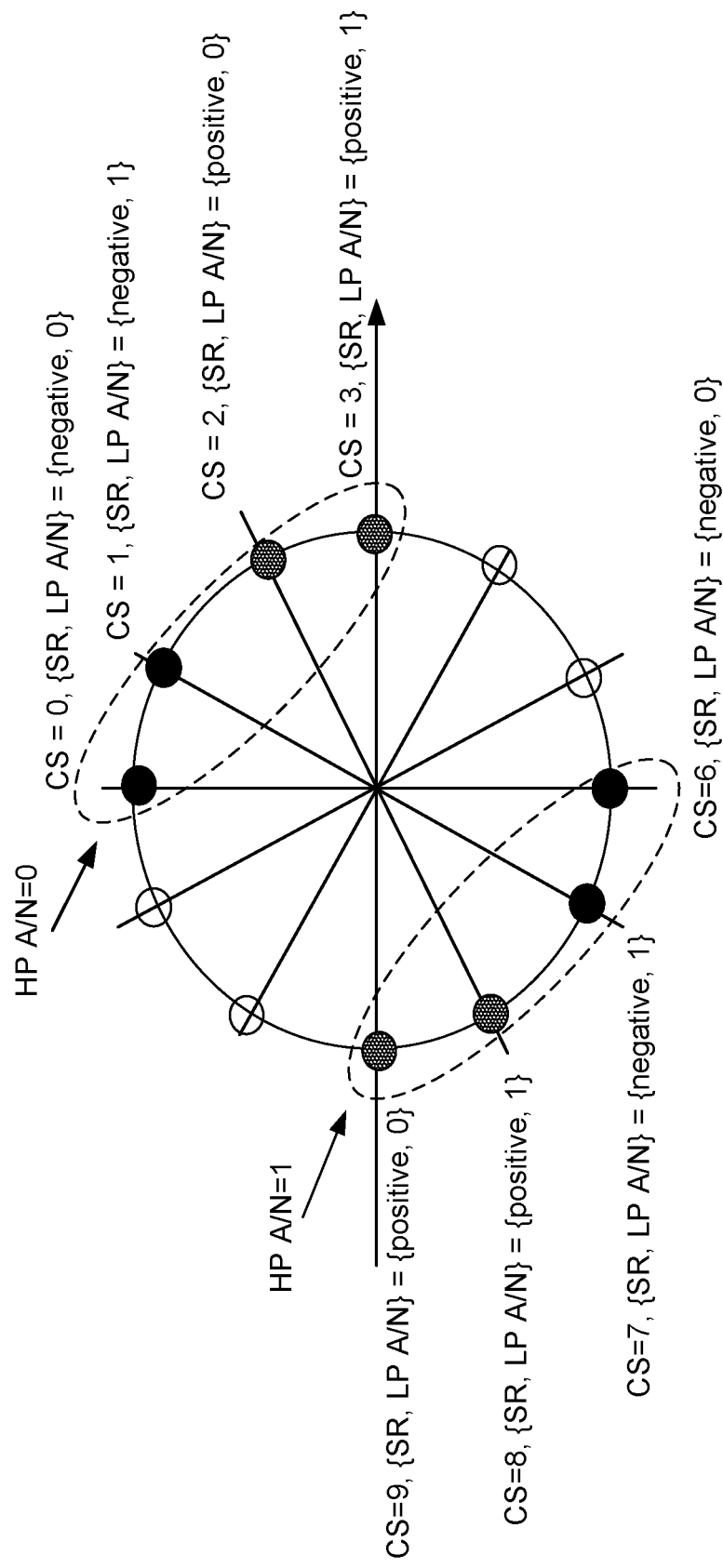

As a sixth example 416, and as shown by FIG. 4G, UE 120 may be configured to transmit a multiplexed message conveying a low priority SR and a 2 bit HARQ feedback message that includes a first bit that is high priority and a second bit that is low priority. In other words, the first, high priority payload may be 1 bit of HARQ feedback and the second, low priority payload may be 1 bit of HARQ feedback and a 1 bit SR. In this case, UE 120 may select a first cyclic shift set (e.g., CS values 0, 1, 2, or 3) to convey an A/N value {0} or a second cyclic shift set (e.g., CS values 6, 7, 8, or 9) to convey an A/N value {1}. Similarly, UE 120 may select a cyclic shift from within a cyclic shift set to convey a value for the low HARQ feedback bit and the low priority SR bit. For example, when UE 120 is conveying {0} (cyclic shift set 0, 1, 2, or 3), UE 120 may select CS value 0 for {negative, 0} (e.g., resulting in a total A/N value of {0, 0}), CS value 1 for {negative, 1} (e.g., resulting in a total A/N value of {0, 1}), CS value 2 for {positive, 1} (e.g., resulting in a total A/N value of {0, 1}), or CS value 3 for {positive, 0} (e.g., resulting in a total A/N value of {0, 0}).

Returning to FIG. 4A, and as shown by reference number 420, UE 120 may transmit the multiplexed message with the selected cyclic shift. For example, using the selected cyclic shift of the selected cyclic shift set, UE 120 may transmit a multiplexed message that includes a high priority payload and a low priority payload. Additionally, or alternatively, UE 120 may transmit a multiplexed message that has another set of payload priorities or a different quantity of payloads, among other examples.

As further shown in FIG. 4A, and by reference number 430, base station 110 may decode the multiplexed message with the selected cyclic shift. For example, base station 110 may determine a cyclic shift set that UE 120 used for transmission of the multiplexed message to determine a value for a high priority payload. As an example, UE 120 may determine whether the multiplexed message was transmitted using CS values 0 or 1 or using CS values 6 or 7 to determine, for example, whether a high priority bit is a negative SR or a positive SR. Additionally, or alternatively, base station 110 may determine a cyclic shift within the cyclic shift set to determine a value for the low priority payload. For example, within CS values 0 and 1, base station 110 may determine whether the cyclic shift is 0 for an A/N value of {0} or 11 for an A/N value of {1}, as described above. Other arrangements or configurations of cyclic shift sets, cyclic shifts, and/or payloads are possible, as described above.

As indicated above, FIGS. 4A-4G is provided as an example. Other examples may differ from what is described with respect to FIGS. 4A-4G.

FIG. 5 is a diagram illustrating an example process 500 performed, for example, by a UE, in accordance with the present disclosure. Example process 500 is an example where the UE (e.g., UE 120) performs operations associated with cyclic shift mapping for multiplexed messages with different priorities.

As shown in FIG. 5, in some aspects, process 500 may include generating a multiplexed message including first information with a first priority and second information with a second priority, wherein the first priority is higher than the second priority (block 510). For example, the UE (e.g., using message generation component 708, depicted in FIG. 7) may generate a multiplexed message including first information with a first priority and second information with a second priority, wherein the first priority is higher than the second priority, as described above.

As further shown in FIG. 5, in some aspects, process 500 may include transmitting the multiplexed message using a particular cyclic shift of a particular cyclic shift set of a plurality of cyclic shift sets, wherein the particular cyclic shift set is based at least in part on the first information and the particular cyclic shift is based at least in part on the second information (block 520). For example, the UE (e.g., using transmission component 704, depicted in FIG. 7) may transmit the multiplexed message using a particular cyclic shift of a particular cyclic shift set of a plurality of cyclic shift sets, wherein the particular cyclic shift set is based at least in part on the first information and the particular cyclic shift is based at least in part on the second information, as described above.

Process 500 may include additional aspects, such as any single aspect or any combination of aspects described below and/or in connection with one or more other processes described elsewhere herein.

In a first aspect, each cyclic shift set of the plurality of cyclic shift sets includes a plurality of cyclic shifts each offset from an adjacent cyclic shift by a single cyclic shift value.

In a second aspect, alone or in combination with the first aspect, the plurality of cyclic shift sets includes a first cyclic shift set assigned for a first content value of the first information and a second cyclic shift set assigned for a second content value of the first information.

In a third aspect, alone or in combination with one or more of the first and second aspects, the particular cyclic shift set, for indicating a content of the first information, is the first cyclic shift set or the second cyclic shift set based at least in part on the content of the first information.

In a fourth aspect, alone or in combination with one or more of the first through third aspects, the first cyclic shift set and the second cyclic shift set are disposed such that a distance between first cyclic shifts of the first cyclic shift set and second cyclic shifts of the second cyclic shift set is maximized.

In a fifth aspect, alone or in combination with one or more of the first through fourth aspects, each cyclic shift set, of the plurality of cyclic shift sets, includes a plurality of cyclic shifts corresponding to a plurality of possible contents for the second information.

In a sixth aspect, alone or in combination with one or more of the first through fifth aspects, the particular cyclic shift of the particular cyclic shift set is one of the plurality of cyclic shifts based at least in part on a content of the second information.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
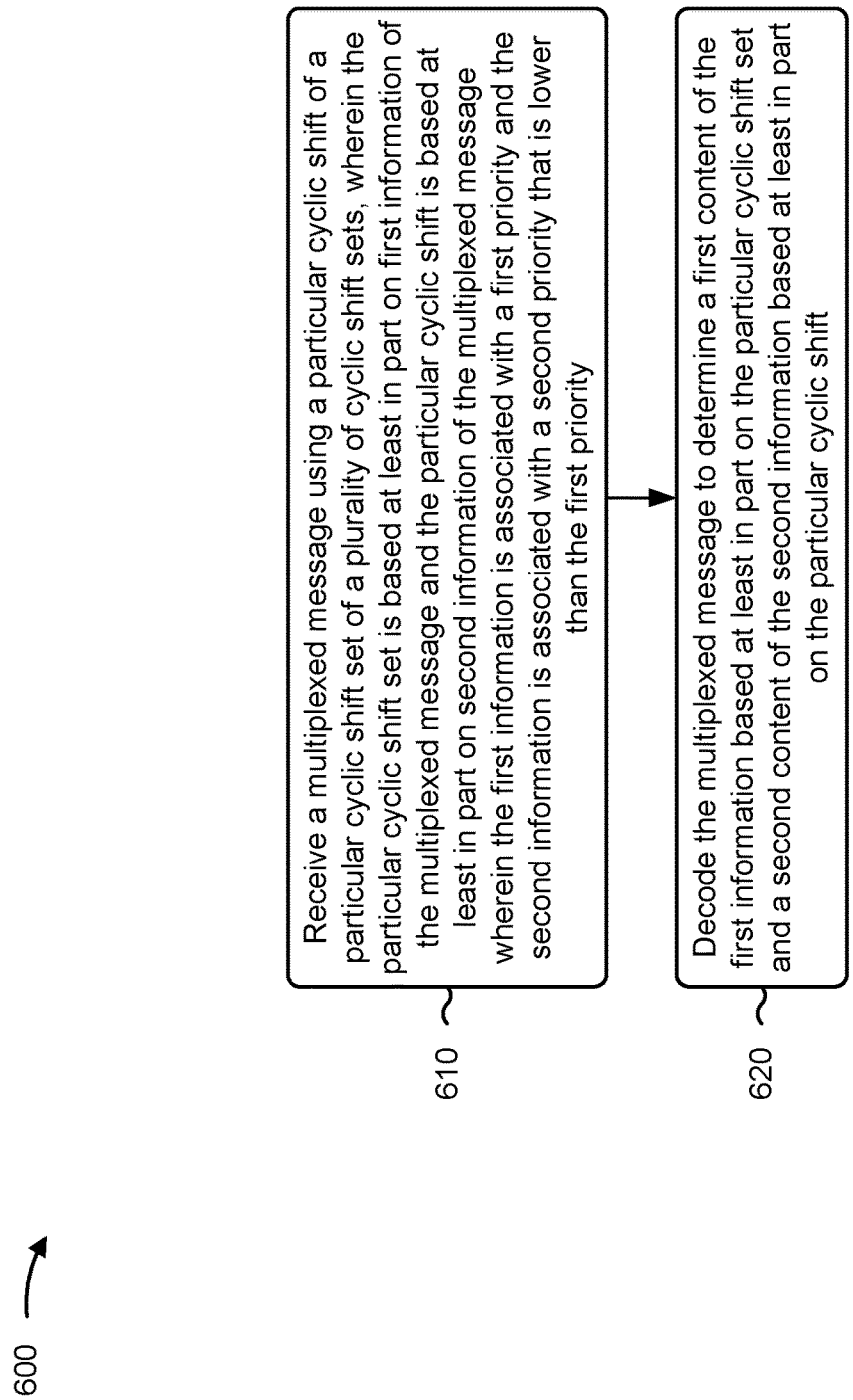

FIG. 6 is a diagram illustrating an example process 600 performed, for example, by a base station, in accordance with the present disclosure. Example process 600 is an example where the base station (e.g., base station 110) performs operations associated with cyclic shift mapping for multiplexed messages with different priorities.

As shown in FIG. 6, in some aspects, process 600 may include receiving a multiplexed message using a particular cyclic shift of a particular cyclic shift set of a plurality of cyclic shift sets, wherein the particular cyclic shift set is based at least in part on first information of the multiplexed message and the particular cyclic shift is based at least in part on second information of the multiplexed message, wherein the first information is associated with a first priority and the second information is associated with a second priority that is lower than the first priority (block 610). For example, the base station (e.g., using reception component 802, depicted in FIG. 8) may receive a multiplexed message using a particular cyclic shift of a particular cyclic shift set of a plurality of cyclic shift sets, wherein the particular cyclic shift set is based at least in part on first information of the multiplexed message and the particular cyclic shift is based at least in part on second information of the multiplexed message, wherein the first information is associated with a first priority and the second information is associated with a second priority that is lower than the first priority, as described above. In some aspects, the first information is associated with a first priority and the second information is associated with a second priority that is lower than the first priority.

As further shown in FIG. 6, in some aspects, process 600 may include decoding the multiplexed message to determine a first content of the first information based at least in part on the particular cyclic shift set and a second content of the second information based at least in part on the particular cyclic shift (block 620). For example, the base station (e.g., using decoding component 808, depicted in FIG. 8) may decode the multiplexed message to determine a first content of the first information based at least in part on the particular cyclic shift set and a second content of the second information based at least in part on the particular cyclic shift, as described above.

Process 600 may include additional aspects, such as any single aspect or any combination of aspects described below and/or in connection with one or more other processes described elsewhere herein.

In a first aspect, each cyclic shift set of the plurality of cyclic shift sets includes a plurality of cyclic shifts each offset from an adjacent cyclic shift by a single cyclic shift value.

In a second aspect, alone or in combination with the first aspect, the plurality of cyclic shift sets includes a first cyclic shift set assigned for a first content value of the first information and a second cyclic shift set assigned for a second content value of the first information.

In a third aspect, alone or in combination with one or more of the first and second aspects, the particular cyclic shift set, for indicating the first content of the first information, is the first cyclic shift set or the second cyclic shift set based at least in part on the first content of the first information.

In a fourth aspect, alone or in combination with one or more of the first through third aspects, the first cyclic shift set and the second cyclic shift set are disposed such that a distance between first cyclic shifts of the first cyclic shift set and second cyclic shifts of the second cyclic shift set is maximized.

In a fifth aspect, alone or in combination with one or more of the first through fourth aspects, each cyclic shift set, of the plurality of cyclic shift sets, includes a plurality of cyclic shifts corresponding to a plurality of possible second contents for the second information.

In a sixth aspect, alone or in combination with one or more of the first through fifth aspects, the particular cyclic shift of the particular cyclic shift set is one of the plurality of cyclic shifts based at least in part on the second content of the second information.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
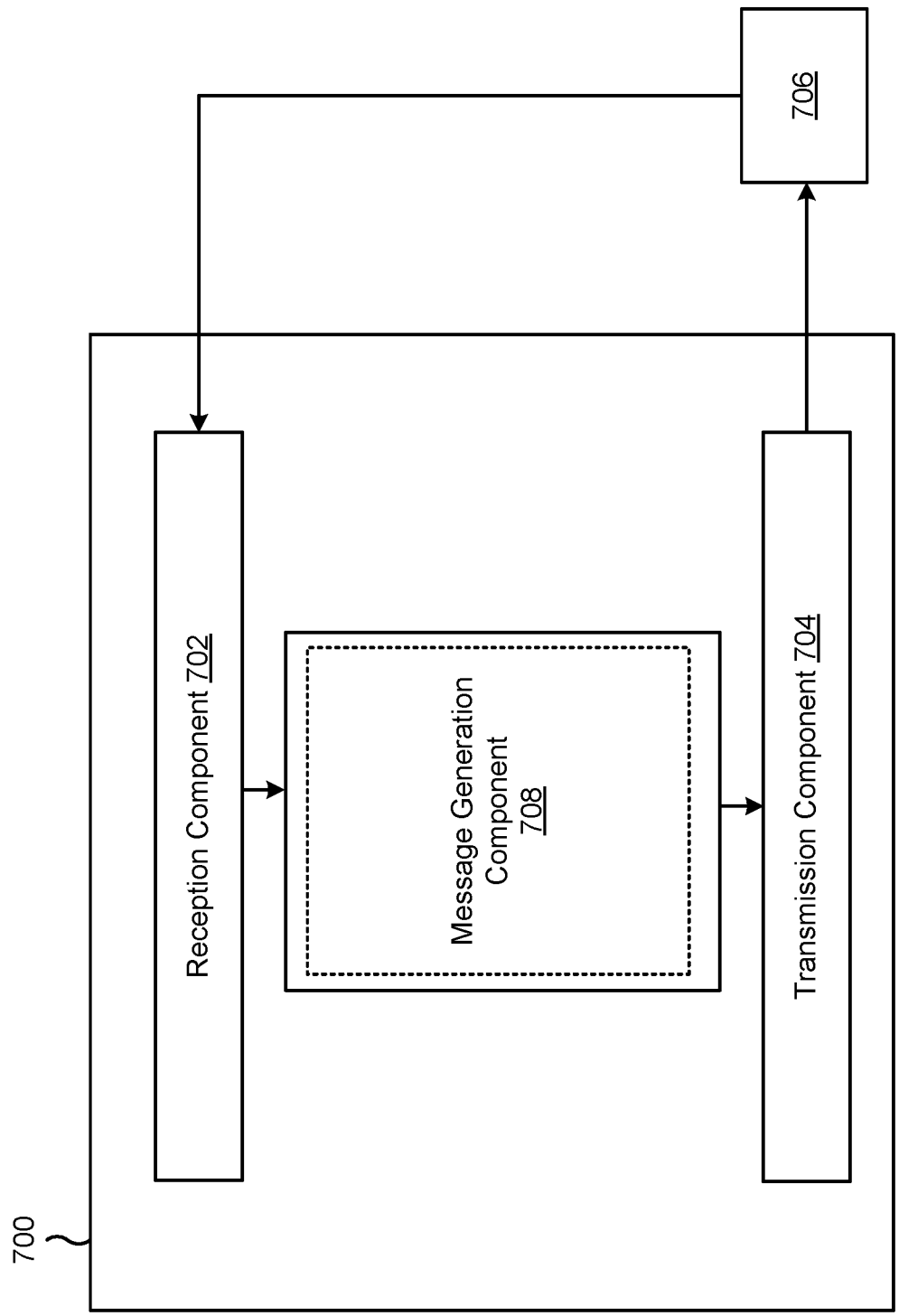
FIGS. 7-8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a message generation component 708, among other examples.

In some aspects, the apparatus 700 may be configured to perform one or more operations described herein in connection with FIGS. 4A-4G. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The message generation component 708 may generate a multiplexed message including first information with a first priority and second information with a second priority, wherein the first priority is higher than the second priority. The transmission component 704 may transmit the multiplexed message using a particular cyclic shift of a particular cyclic shift set of a plurality of cyclic shift sets, wherein the particular cyclic shift set is based at least in part on the first information and the particular cyclic shift is based at least in part on the second information.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
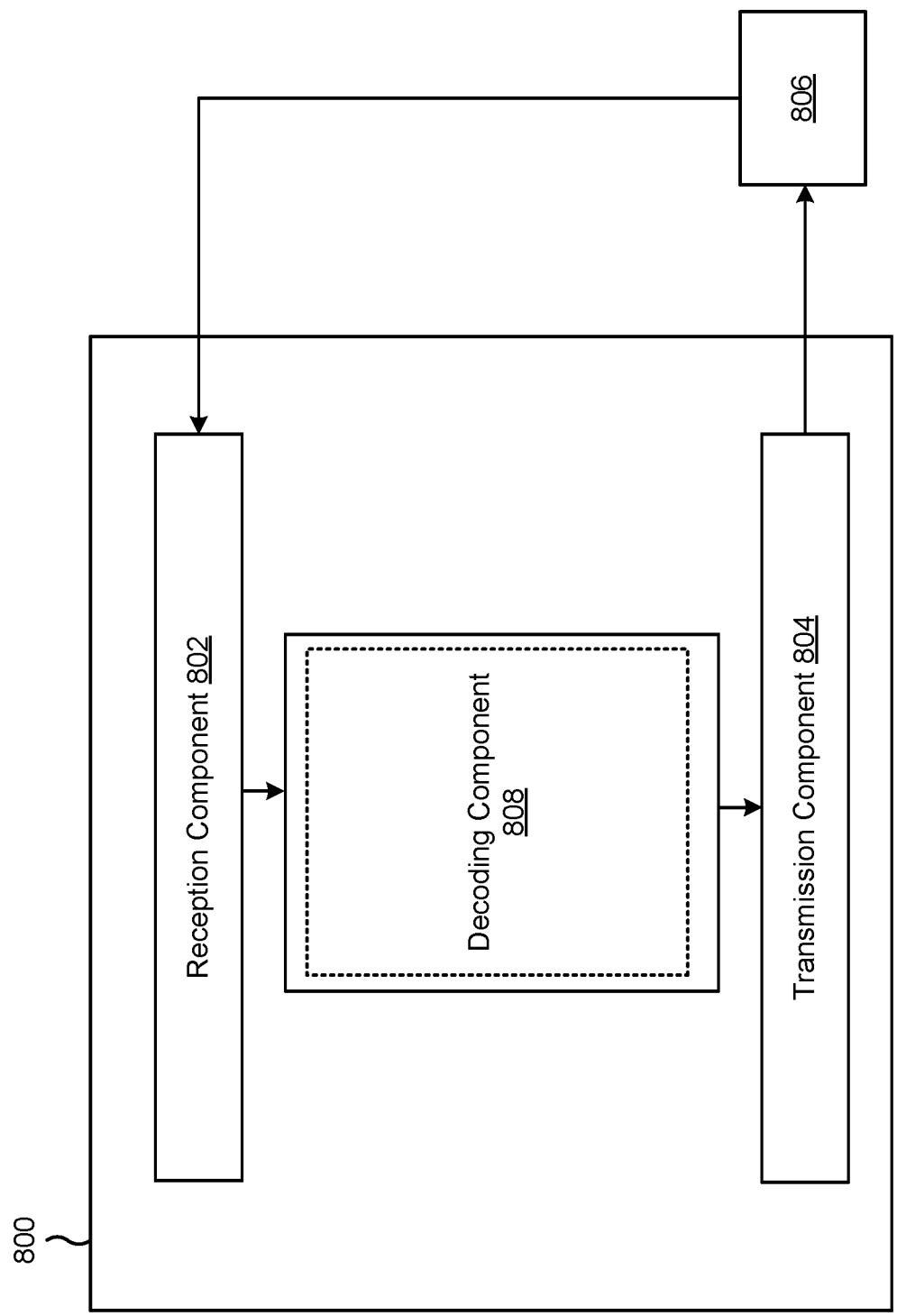

FIG. 8 is a block diagram of an example apparatus 800 for wireless communication. The apparatus 800 may be a BS, or a BS may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a decoding component 808, among other examples.

In some aspects, the apparatus 800 may be configured to perform one or more operations described herein in connection with FIGS. 4A-4G. Additionally, or alternatively, the apparatus 800 may be configured to perform one or more processes described herein, such as process 600 of FIG. 6. In some aspects, the apparatus 800 and/or one or more components shown in FIG. 8 may include one or more components of the BS described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the BS described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the BS described above in connection with FIG. 2. In some aspects, the transmission component 804 may be co-located with the reception component 802 in a transceiver.

The reception component 802 may receive a multiplexed message using a particular cyclic shift of a particular cyclic shift set of a plurality of cyclic shift sets, wherein the particular cyclic shift set is based at least in part on first information of the multiplexed message and the particular cyclic shift is based at least in part on second information of the multiplexed message wherein the first information is associated with a first priority and the second information is associated with a second priority that is lower than the first priority. The decoding component 808 may decode the multiplexed message to determine a first content of the first information based at least in part on the particular cyclic shift set and a second content of the second information based at least in part on the particular cyclic shift.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a UE, comprising: generating a multiplexed message including first information with a first priority and second information with a second priority, wherein the first priority is higher than the second priority; and transmitting the multiplexed message using a particular cyclic shift of a particular cyclic shift set of a plurality of cyclic shift sets, wherein the particular cyclic shift set is based at least in part on the first information and the particular cyclic shift is based at least in part on the second information.

Aspect 2: The method of Aspect 1, wherein each cyclic shift set of the plurality of cyclic shift sets includes a plurality of cyclic shifts each offset from an adjacent cyclic shift by a single cyclic shift value.

Aspect 3: The method of any of Aspects 1 to 2, wherein the plurality of cyclic shift sets includes a first cyclic shift set assigned for a first content value of the first information and a second cyclic shift set assigned for a second content value of the first information.

Aspect 4: The method of Aspect 3, wherein the particular cyclic shift set, for indicating a content of the first information, is the first cyclic shift set or the second cyclic shift set based at least in part on the content of the first information.

Aspect 5: The method of any of Aspects 3 to 4, wherein the first cyclic shift set and the second cyclic shift set are disposed such that a distance between first cyclic shifts of the first cyclic shift set and second cyclic shifts of the second cyclic shift set is maximized.

Aspect 6: The method of any of Aspects 1 to 5, wherein each cyclic shift set, of the plurality of cyclic shift sets, includes a plurality of cyclic shifts corresponding to a plurality of possible contents for the second information.

Aspect 7: The method of Aspect 6, wherein the particular cyclic shift of the particular cyclic shift set is one of the plurality of cyclic shifts based at least in part on a content of the second information.

Aspect 8: A method of wireless communication performed by a base station, comprising: receiving a multiplexed message using a particular cyclic shift of a particular cyclic shift set of a plurality of cyclic shift sets, wherein the particular cyclic shift set is based at least in part on first information of the multiplexed message and the particular cyclic shift is based at least in part on second information of the multiplexed message, wherein the first information is associated with a first priority and the second information is associated with a second priority that is lower than the first priority; and decoding the multiplexed message to determine a first content of the first information based at least in part on the particular cyclic shift set and a second content of the second information based at least in part on the particular cyclic shift.

Aspect 9: The method of Aspect 8, wherein each cyclic shift set of the plurality of cyclic shift sets includes a plurality of cyclic shifts each offset from an adjacent cyclic shift by a single cyclic shift value.

Aspect 10 The method of any of Aspects 8 to 9, wherein the plurality of cyclic shift sets includes a first cyclic shift set assigned for a first content value of the first information and a second cyclic shift set assigned for a second content value of the first information.

Aspect 11: The method of Aspect 10, wherein the particular cyclic shift set, for indicating the first content of the first information, is the first cyclic shift set or the second cyclic shift set based at least in part on the first content of the first information.

Aspect 12: The method of any of Aspects 10 to 11, wherein the first cyclic shift set and the second cyclic shift set are disposed such that a distance between first cyclic shifts of the first cyclic shift set and second cyclic shifts of the second cyclic shift set is maximized.

Aspect 13: The method of any of Aspects 8 to 12, wherein each cyclic shift set, of the plurality of cyclic shift sets, includes a plurality of cyclic shifts corresponding to a plurality of possible second contents for the second information.

Aspect 14: The method of Aspect 13, wherein the particular cyclic shift of the particular cyclic shift set is one of the plurality of cyclic shifts based at least in part on the second content of the second information.

Aspect 15: An apparatus for wireless communication at a device, comprising a processor; memory coupled with the processor; and instructions stored in the memory and executable by the processor to cause the apparatus to perform the method of one or more Aspects of Aspects 1-7.

Aspect 16: A device for wireless communication, comprising a memory and one or more processors coupled to the memory, the memory and the one or more processors configured to perform the method of one or more Aspects of Aspects 1-7.

Aspect 17: An apparatus for wireless communication, comprising at least one means for performing the method of one or more Aspects of Aspects 1-7.

Aspect 18: A non-transitory computer-readable medium storing code for wireless communication, the code comprising instructions executable by a processor to perform the method of one or more Aspects of Aspects 1-7.

Aspect 19: A non-transitory computer-readable medium storing a set of instructions for wireless communication, the set of instructions comprising one or more instructions that, when executed by one or more processors of a device, cause the device to perform the method of one or more Aspects of Aspects 1-7.

Aspect 20: An apparatus for wireless communication at a device, comprising a processor; memory coupled with the processor; and instructions stored in the memory and executable by the processor to cause the apparatus to perform the method of one or more Aspects of Aspects 8-14.

Aspect 21: A device for wireless communication, comprising a memory and one or more processors coupled to the memory, the memory and the one or more processors configured to perform the method of one or more Aspects of Aspects 8-14.

Aspect 22: An apparatus for wireless communication, comprising at least one means for performing the method of one or more Aspects of Aspects 8-14.

Aspect 23: A non-transitory computer-readable medium storing code for wireless communication, the code comprising instructions executable by a processor to perform the method of one or more Aspects of Aspects 8-14.

Aspect 24: A non-transitory computer-readable medium storing a set of instructions for wireless communication, the set of instructions comprising one or more instructions that, when executed by one or more processors of a device, cause the device to perform the method of one or more Aspects of Aspects 8-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   generating a multiplexed message including first information with a first priority and second information with a second priority, wherein the first priority is higher than the second priority; and
   transmitting the multiplexed message using a particular cyclic shift of a particular cyclic shift set of a plurality of cyclic shift sets,
   wherein the particular cyclic shift set is based at least in part on the first information and the particular cyclic shift is based at least in part on the second information,
   wherein a first spacing between cyclic shifts, of the plurality of cyclic shift sets is maximized within an available space, and
   wherein a second spacing between cyclic shifts of the cyclic shift sets is minimized within the available space.

2. The method of claim 1, wherein each cyclic shift set of the plurality of cyclic shift sets includes a plurality of cyclic shifts each offset from an adjacent cyclic shift by a single cyclic shift value.

3. The method of claim 1, wherein the plurality of cyclic shift sets includes a first cyclic shift set assigned for a first content value of the first information and a second cyclic shift set assigned for a second content value of the first information.

4. The method of claim 3, wherein the particular cyclic shift set, for indicating a content of the first information, is the first cyclic shift set or the second cyclic shift set based at least in part on the content of the first information.

5. The method of claim 3, wherein the first cyclic shift set and the second cyclic shift set are disposed such that a distance between first cyclic shifts of the first cyclic shift set and second cyclic shifts of the second cyclic shift set is maximized.

6. The method of claim 1, wherein each cyclic shift set, of the plurality of cyclic shift sets, includes a plurality of cyclic shifts corresponding to a plurality of possible contents for the second information.

7. The method of claim 6, wherein the particular cyclic shift of the particular cyclic shift set is one of the plurality of cyclic shifts based at least in part on a content of the second information.

8. The method of claim 1, wherein the first information comprises a 1 bit scheduling request (SR) and the second information comprises a 1 bit hybrid automatic repeat request (HARQ) feedback message.

9. The method of claim 1, wherein the first information comprises a 1 bit scheduling request (SR) and the second information comprises a 2 bit hybrid automatic repeat request (HARQ) feedback message.

10. The method of claim 1, wherein the first information comprises a hybrid automatic repeat request (HARQ) feedback message and the second information comprises a scheduling request (SR).

11. A method of wireless communication performed by a network entity, comprising:
    receiving a multiplexed message using a particular cyclic shift of a particular cyclic shift set of a plurality of cyclic shift sets, wherein the particular cyclic shift set is based at least in part on first information of the multiplexed message and the particular cyclic shift is based at least in part on second information of the multiplexed message,
    wherein the first information is associated with a first priority and the second information is associated with a second priority that is lower than the first priority,
    wherein a first spacing between cyclic shifts, of the plurality of cyclic shift sets is maximized within an available space, and
    wherein a second spacing between cyclic shifts of the cyclic shift sets is minimized within the available space; and
    decoding the multiplexed message to determine a first content of the first information based at least in part on the particular cyclic shift set and a second content of the second information based at least in part on the particular cyclic shift.

12. The method of claim 11, wherein each cyclic shift set of the plurality of cyclic shift sets includes a plurality of cyclic shifts each offset from an adjacent cyclic shift by a single cyclic shift value.

13. The method of claim 11, wherein the plurality of cyclic shift sets includes a first cyclic shift set assigned for a first content value of the first information and a second cyclic shift set assigned for a second content value of the first information.

14. The method of claim 13, wherein the particular cyclic shift set, for indicating the first content of the first information, is the first cyclic shift set or the second cyclic shift set based at least in part on the first content of the first information.

15. The method of claim 13, wherein the first cyclic shift set and the second cyclic shift set are disposed such that a distance between first cyclic shifts of the first cyclic shift set and second cyclic shifts of the second cyclic shift set is maximized.

16. The method of claim 11, wherein each cyclic shift set, of the plurality of cyclic shift sets, includes a plurality of cyclic shifts corresponding to a plurality of possible second contents for the second information.

17. The method of claim 16, wherein the particular cyclic shift of the particular cyclic shift set is one of the plurality of cyclic shifts based at least in part on the second content of the second information.

18. A user equipment (UE) for wireless communication, comprising:
one or more memories; and
one or more processors, coupled to the one or more memories, configured to:
generate a multiplexed message including first information with a first priority and second information with a second priority, wherein the first priority is higher than the second priority; and
transmit the multiplexed message using a particular cyclic shift of a particular cyclic shift set of a plurality of cyclic shift sets,
wherein the particular cyclic shift set is based at least in part on the first information and the particular cyclic shift is based at least in part on the second information,
wherein a first spacing between cyclic shifts, of the plurality of cyclic shift sets is maximized within an available space, and
wherein a second spacing between cyclic shifts of the cyclic shift sets is minimized within the available space.

19. The UE of claim 18, wherein each cyclic shift set of the plurality of cyclic shift sets includes a plurality of cyclic shifts each offset from an adjacent cyclic shift by a single cyclic shift value.

20. The UE of claim 18, wherein the plurality of cyclic shift sets includes a first cyclic shift set assigned for a first content value of the first information and a second cyclic shift set assigned for a second content value of the first information.

21. The UE of claim 20, wherein the particular cyclic shift set, for indicating a content of the first information, is the first cyclic shift set or the second cyclic shift set based at least in part on the content of the first information.

22. The UE of claim 20, wherein the first cyclic shift set and the second cyclic shift set are disposed such that a distance between first cyclic shifts of the first cyclic shift set and second cyclic shifts of the second cyclic shift set is maximized.

23. The UE of claim 18, wherein each cyclic shift set, of the plurality of cyclic shift sets, includes a plurality of cyclic shifts corresponding to a plurality of possible contents for the second information.

24. The UE of claim 23, wherein the particular cyclic shift of the particular cyclic shift set is one of the plurality of cyclic shifts based at least in part on a content of the second information.

25. A network entity for wireless communication, comprising:
one or more memories; and
one or more processors, coupled to the one or more memories, configured to:
receive a multiplexed message using a particular cyclic shift of a particular cyclic shift set of a plurality of cyclic shift sets,
wherein the particular cyclic shift set is based at least in part on first information of the multiplexed message and the particular cyclic shift is based at least in part on second information of the multiplexed message,
wherein the first information is associated with a first priority and the second information is associated with a second priority that is lower than the first priority,
wherein a first spacing between cyclic shifts, of the plurality of cyclic shift sets is maximized within an available space, and
wherein a second spacing between cyclic shifts of the cyclic shift sets is minimized within the available space; and
decode the multiplexed message to determine a first content of the first information based at least in part on the particular cyclic shift set and a second content of the second information based at least in part on the particular cyclic shift.

26. The network entity of claim 25, wherein each cyclic shift set of the plurality of cyclic shift sets includes a plurality of cyclic shifts each offset from an adjacent cyclic shift by a single cyclic shift value.

27. The network entity of claim 25, wherein the plurality of cyclic shift sets includes a first cyclic shift set assigned for a first content value of the first information and a second cyclic shift set assigned for a second content value of the first information.

28. The network entity of claim 27, wherein the particular cyclic shift set, for indicating a content of the first information, is the first cyclic shift set or the second cyclic shift set based at least in part on the content of the first information.

29. The network entity of claim 27, wherein the first cyclic shift set and the second cyclic shift set are disposed such that a distance between first cyclic shifts of the first cyclic shift set and second cyclic shifts of the second cyclic shift set is maximized.

30. The network entity of claim 25, wherein each cyclic shift set, of the plurality of cyclic shift sets, includes a plurality of cyclic shifts corresponding to a plurality of possible contents for the second information.

* * * * *